United States Patent
Jamadagni et al.

(10) Patent No.: US 8,249,032 B2
(45) Date of Patent: Aug. 21, 2012

(54) SYSTEM AND METHOD FOR MANAGING COMMUNICATION IN A WIRELESS COMMUNICATION NETWORK

(75) Inventors: Nanjunda Swamy Satish Jamadagni, Byrasandra (IN); Jong-Soo Choi, Jeonju (KR); Sarvesha Anegundi Ganapathi, Byrasandra (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 12/754,811

(22) Filed: Apr. 6, 2010

(65) Prior Publication Data

US 2010/0254280 A1    Oct. 7, 2010

(30) Foreign Application Priority Data

Apr. 6, 2009  (IN) .................. 802/CHE/2009PS
Apr. 6, 2010  (IN) .................. 802/CHE/2009CS

(51) Int. Cl.
*H04J 3/00*  (2006.01)
*H04W 72/04*  (2009.01)
(52) U.S. Cl. ....................... 370/336; 370/252
(58) Field of Classification Search .......... None
See application file for complete search history.

(56) References Cited

U.S. PATENT DOCUMENTS

| | | | |
|---|---|---|---|
| 7,719,991 B2 * | 5/2010 | Bhushan et al. | 370/252 |
| 8,060,130 B2 * | 11/2011 | Gholmieh et al. | 455/522 |
| 2003/0063606 A1 * | 4/2003 | Odenwalder et al. | 370/389 |
| 2006/0215593 A1 | 9/2006 | Wang et al. | |
| 2008/0225985 A1 | 9/2008 | Wu et al. | |
| 2009/0046675 A1 | 2/2009 | Pratt et al. | |
| 2010/0110912 A1 * | 5/2010 | Wang et al. | 370/252 |
| 2010/0189046 A1 * | 7/2010 | Baker et al. | 370/329 |
| 2011/0142013 A1 * | 6/2011 | Manssour et al. | 370/336 |
| 2012/0039209 A1 * | 2/2012 | Zeira et al. | 370/252 |

* cited by examiner

*Primary Examiner* — Clemence Han
(74) *Attorney, Agent, or Firm* — Jefferson IP Law, LLP

(57) ABSTRACT

A system and method for allocating a single timeslot to multiple communication devices in a wireless communication network are disclosed. The method includes establishing a first communication channel between a base transceiver station and first communication devices through a first timeslots of a frame. The method further includes establishing a second communication channel between the base transceiver station and second communication devices through second timeslots. The method also includes determining whether a third communication channel can be established between the base transceiver station and at least one of the second communication devices using at least one of the first timeslots based on a set of predefined parameters evaluated for each of the first timeslots. Moreover, the method includes establishing the third communication channel between the base transceiver station and the at least one of the second communication devices using at least one of the first timeslots.

24 Claims, 6 Drawing Sheets

SYSTEM AND METHOD FOR MANAGING COMMUNICATION IN A WIRELESS COMMUNICATION NETWORK

PRIORITY

This application claims the benefit under 35 U.S.C. §119 (a) of Indian patent applications assigned Serial No. 802/CHE/2009(PS) filed on Apr. 6, 2009 and Serial No. 802/CHE/2009(CS) filed on Apr. 6, 2010 in the Indian Intellectual Property Office, the entire disclosures of both of which are hereby incorporated by reference.

BACKGROUND OF THE INVENTION

1. Field of the Invention

The present invention relates to wireless communication networks. More particularly, the present invention relates to a system and method for managing communication in a wireless communication network.

2. Description of Related Art

Time Division Multiple Access (TDMA) systems, such as Global System for Mobile Communication (GSM), have a plurality of timeslots in a given time frame. For example in GSM, each TDMA time frame has eight timeslots. Conventionally, each timeslot is reserved for use by a particular communication device for receiving or transmitting user data from or to a base station in a cellular environment.

Digital mobile communication systems for voice such as GSM, and Digital Advanced Mobile Systems (DAMPS) have expanded very rapidly in recent years. In addition, great demand for data service has been created by mobile users due to wide spread acceptance of the Internet. General Packet Radio Service (GPRS), Enhanced Data rate for GSM (EDGE), and Universal Mobile Telecommunications Services (UMTS) are all being developed to accommodate data users in wireless networks. Schemes for the transmission of voice over fixed packet switch networks have also been developed in recent years and an increasing amount of voice traffic will be carried over packet switched networks in the future.

With the recent advancement in the digital mobile communication systems, various approaches have been developed to allow multiple communication devices to reuse a single timeslot in a frame, referred to as Multiple Users Reusing One Slot (MUROS) technology. MUROS technology allows pairing of two or more communication devices (e.g., up to four) to use one single timeslot to transmit or receive voice signals in the GSM, GPRS, EDGE wireless systems. Theoretically, MUROS technology enhances a cell capacity through pairing two or more communication devices onto a single timeslot. Therefore, MUROS may be able to at least double voice capacity of the wireless network without requiring additional Transmit and Receive radio resources (TRX).

The communication devices in the cell should be paired onto a single timeslot in such a way that link quality for either of the paired communication devices does not see a drastic degradation. For example, if upon pairing, the link quality sees a sudden degradation, then calls associated with the paired communication devices may get dropped. The link quality of the communication devices that are paired mainly depends on Bit Error Rate (BER) and Signal to Noise Ratio (SNR) characteristics of the communication devices.

Typically, communication devices with high SNR or similar power levels may form good candidates for sharing a single timeslot. As an example, two or more communication devices are assumed to be allocated a single timeslot based on their SNR values or power levels. In that case, if the communication devices in the cell do not have the same or similar power levels or high SNR values, then the power of individual communication devices is boosted before pairing to have acceptable Frame Error Rates (FERs). However, power boosting of the communication devices prior to pairing may add to the total interference in the wireless network and thus may introduce additional complexity to power control.

Further, in the currently known techniques, BER characteristics of the communication devices to be paired are not verified prior to allocating the single timeslot to the communication devices. As a consequence, the link quality of the communication devices may see a drastic degradation under paired conditions, thereby resulting in dropped calls. Additionally, the paired communication devices in the cell require boosting of power after being paired to maintain links and to have acceptable FERs.

SUMMARY OF THE INVENTION

An aspect of the present invention is to address at least the above-mentioned problems and/or disadvantages and to provide at least the advantages described below. Accordingly, an aspect of the present invention is to provide a system and method for managing communication in a wireless communication network is disclosed.

In accordance with an aspect of the present invention, a method for managing communication in a wireless communication network is provided. The method includes establishing a first communication channel between a base transceiver station and a plurality of first communication devices through first timeslots of a frame. The method further includes establishing a second communication channel between the base transceiver station and a plurality of second communication devices through second timeslots of the frame.

The method also includes determining whether a third communication channel can be established between the base transceiver station and at least one of the plurality of second communication devices using at least one of the first timeslots based on a set of predefined parameters evaluated for the first timeslots, where the set of predefined parameters are evaluated by the plurality of second communication devices.

Moreover, the method includes establishing the third communication channel between the base transceiver station and the at least one of the plurality of second communication devices through the at least one of the first timeslots based on the determination.

In accordance with another aspect of the present invention, a computing device for managing communication in a wireless communication network is provided. The computing device includes a network interface and processor for performing the method described above.

In accordance with yet another aspect of the present invention, a system is provided. The system includes a plurality of first communication devices, a plurality of second communication devices, and a base transceiver station wirelessly coupled to the plurality of first and second communication devices via a plurality of wireless links. The base transceiver station includes a processor and memory coupled to the processor. The memory includes a communication management module having instructions capable of establishing a first communication channel between the base transceiver station and a plurality of first communication devices through first timeslots of a frame, and establishing a second communication channel between the base transceiver station and the plurality of second communication devices through second timeslots of the frame.

The communication management module may further include instructions to determine whether a third communication channel can be established between the base transceiver station and at least one of the plurality of second communication devices through at least one of the first timeslots based on a set of predefined parameters for the first timeslots. The set of predefined parameters may be evaluated by the plurality of second communication devices.

If the third communication channel can be established, the communication management module may have instructions to establish the third communication channel between the base transceiver station and the at least one of the plurality of second communication devices using the at least one of the first timeslots.

In still a further aspect of the present invention, a method of a communication device for managing communication in a wireless communication network is provided. The method includes sending a request to a base transceiver station to establish a communication channel. Further, the method includes receiving dummy data on one or more timeslots assigned to one or more communication devices, wherein the one or more communication devices are in the same area of network as the communication device.

Furthermore, the method includes evaluating a set of predefined parameters for each of the one or more timeslots based on the dummy data. Moreover, the method includes establishing the communication channel with the base transceiver station using one of the one or more timeslots, where the one of the one or more timeslots is assigned to the communication device by the base transceiver station based on the values of the evaluated set of predefined parameters for said each of the one or more timeslots.

In accordance with yet a further aspect of the present invention, a non-transitory computer-readable storage medium for managing communication in a wireless communication network is provided. The computer-readable storage medium includes instructions that, when executed by a computing device, cause the computing device to perform the method described above.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following detailed description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein cab be made without departing from the spirit scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
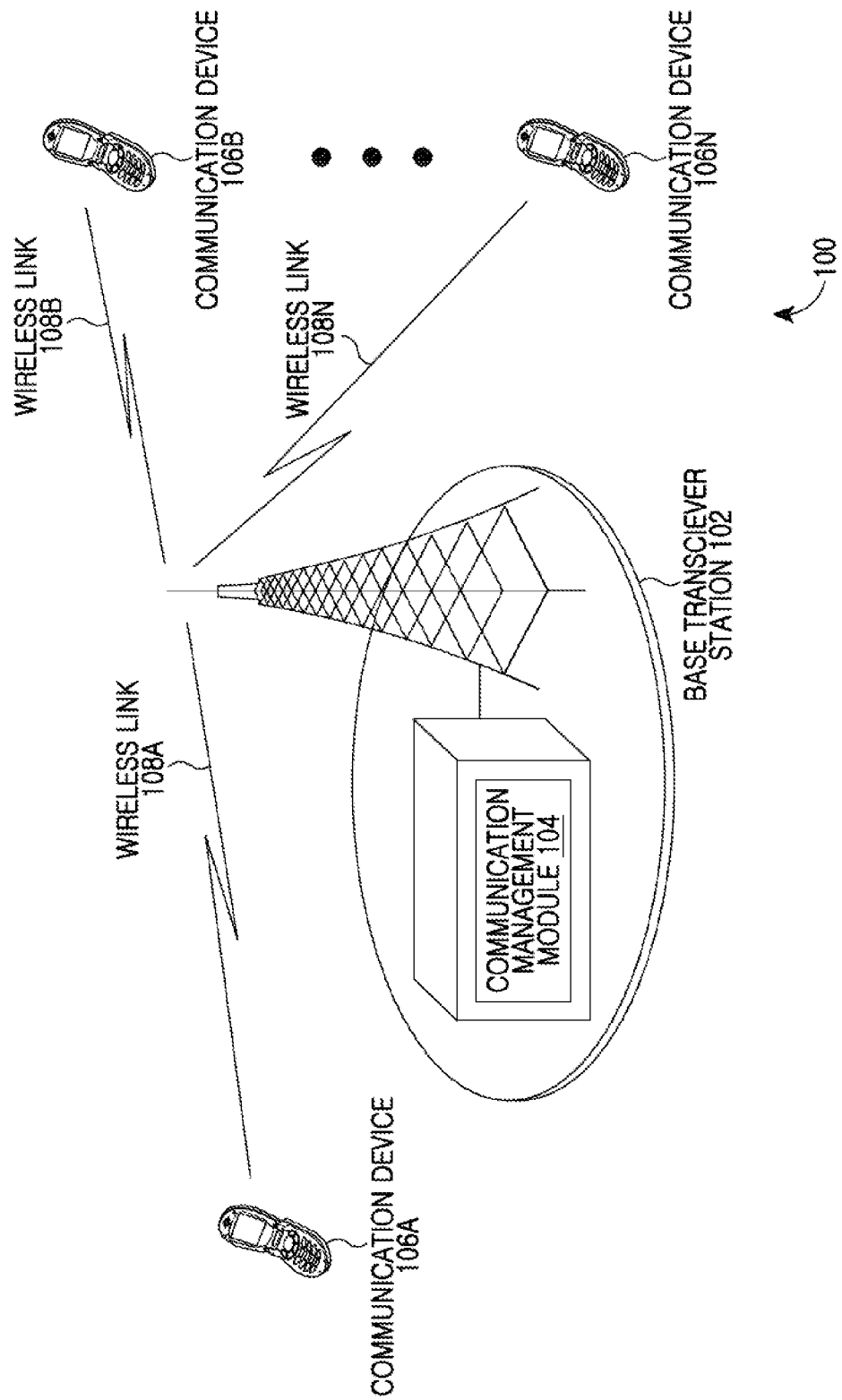
FIG. 1 illustrates a wireless communication network with a base transceiver station having a communication management module for managing communication in the wireless communication network according to an exemplary embodiment of the present invention.

FIG. 1 illustrates a wireless communication network with a base transceiver station having a communication management module for managing communication in the wireless communication network according to an exemplary embodiment of the present invention.

Referring to FIG. 1, a wireless communication network 100 includes a base transceiver station 102 having a communication management module 104 for managing communication in the wireless communication network 100 and a plurality of communication devices 106A-N. The wireless communication network 100 of FIG. 1 may be a Global System for Mobile communication (GSM) network, General Packet Radio Service (GPRS) network, and Enhanced Data rates for GSM Evolution (EDGE) network. The plurality of communication devices 106A-N are wirelessly connected to the base transceiver station 102 via a plurality of wireless links 108A-N.

For the purpose of illustration, the communication devices 106A-H are herein referred to as "first communication devices 106A-H" and the communication devices 106I-N are herein referred to as "second communication devices 106I-N". Consider that, the base transceiver station 102 assigns first timeslots of a frame to the first communication devices 106A-H. Further, the base transceiver station 102 establishes a first communication channel between the base transceiver station 102 and the first communication devices 106A-H through the first timeslots. The first communication channel enables communication between the base transceiver station 102 and the first communication devices 106A-H using the first timeslots of the frame.

Also for the purpose of illustration, the base transceiver station 102 assigns second timeslots of the frame to the second set of communication devices 106I-N. Further, the base transceiver station 102 establishes a second communication channel between the base transceiver station 102 and the second communication devices 106I-N through the second timeslots. The second communication channel enables communication between the base transceiver station 102 and the second communication devices 106I-N using the second timeslots of the frame. In some exemplary embodiments, the second communication channel is established upon receiving requests from the second communication devices 106I-N.

At peak load conditions, i.e., when capacity of the base transceiver station 102 has reached a maximum limit, the communication management module 104 may manage communication in the wireless communication network in a manner described below. In an exemplary operation, the communication management module 104 of the base transceiver station 102 may send dummy data on the first timeslots to the second communication devices 106I-N. The dummy data may be a pseudo random sequence. The second communication devices 106I-N may include communication devices which are in close geometric proximity to the base transceiver station 102.

In accordance with exemplary embodiments of the present invention, the communication management module 104 may send the dummy data to the second communication devices 106I-N and user data to the first communication devices 106A-H in the first timeslots. In these exemplary embodiments, the communication management module 104 may send the dummy data in the first timeslots substantially simultaneously to user data associated with the second communication devices 106I-N in the second timeslots. It can be noted that, while sending the dummy data in the first timeslots, the communication management module 104 may provide higher power to the first communication devices such that the first communication device can perceive a better link quality.

Upon receiving the dummy data in the first timeslots, each of the second communication devices 106I-N may decode the dummy data in each of the first timeslots. Each of the second communication devices 106I-N may then evaluate a set of predefined parameters using the decoded dummy data for each of the first timeslots. The set of predefined parameters may include a Bit Error Rate (BER), a Quality of Experience (QoE), a signal quality, a signal power associated with each of the first timeslots, and the like.

Further, each of the second communication devices 106I-N may forward information associated with the set of predefined parameters to the communication management module 104. The communication management module 104 may then determine whether the set of predefined parameters for any of the first timeslot is below a predetermined threshold. For example, the BER threshold may be a BER <1%. Further, the QOE threshold may be based on qualitative measures. The Signal to Noise Ratio (SNR) threshold may be SNR <1% and a signal power threshold may be in terms of Received Signal Strength Indicator (RSSI) in the range 0 to 255.

The communication management module 104 may assign each one of the first timeslots, for which the set of predefined parameters is below the predetermined threshold, to the corresponding one or more of the second communication devices 106I-N.

Accordingly, the base transceiver station 102 establishes a third communication channel between the base transceiver station 102 and one or more of the second communication devices 106I-N through the assigned first timeslots. Thus, the third communication channel enables the one or more of the second communication devices 106I-N to transmit and/or receive user data using the assigned first timeslots. In some exemplary embodiments, the communication management module 104 may relinquish the second communication channel when the third communication channel is established. The communication management module 104 may ramp-up the power on the assigned first timeslots upon establishing the third communication channel to perceive better link quality.

If the set of predefined parameters are found to be above the predetermined threshold for remaining second communication devices, then the communication management module 104 may order the remaining second communication devices to stop decoding the dummy data. Further, the communication management module 104 may order the remaining second communication devices to continue communication via the second communication channel using the second timeslots.

In this manner, the communication management module 104 enables intra-cell inter-channel measurement ordering and reporting. Further, the communication management module 104 enables one of the first communication devices 106A-H and the one or more of the second communication devices 106I-N to communicate with the base transceiver station 102 using a common timeslot. In one exemplary embodiment, the base transceiver station 102 transmits or receives user data associated with the one or more of the second communication devices 106I-N and the one of the first communication device 106A-H using the common timeslot. Since the common timeslot is assigned based on the information associated with the set of predefined parameters as reported by the second communication devices 106I-N, link quality is not degraded when the one or more of the second communication devices are paired with one of the first communication devices 106A-H.

Figure 2:
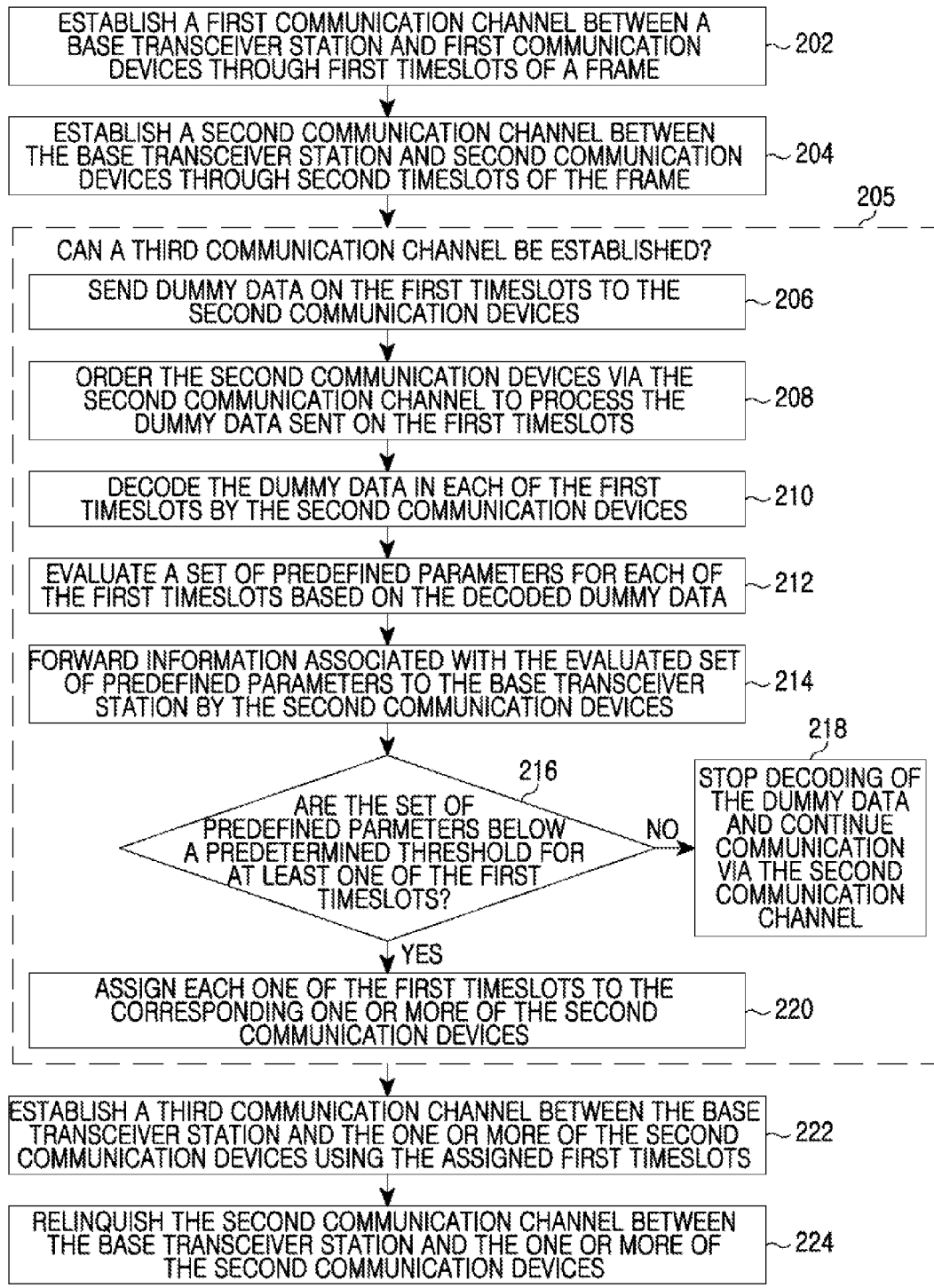
FIG. 2 is a flowchart illustrating a method of a base transceiver station for managing communication in a wireless communication network according to an exemplary embodiment of the present invention.

FIG. 2 is a flowchart illustrating a method of a base transceiver station for managing communication in a wireless communication network according to an exemplary embodiment of the present invention.

Referring to FIG. 2, at step 202, a first communication channel is established between a base transceiver station and first communication devices through first timeslots of a frame. At step 204, a second communication channel is established between the base transceiver station and second communication devices through second timeslots of the frame.

At step 205, it is determined whether a third communication channel can be established between the base transceiver station and one or more of the second communication devices using at least one of the first timeslots. The determination process is described in greater detail in steps 206-220 below. At step 206, dummy data is sent on the first timeslots to the second communication devices. At step 208, the second communication devices are ordered via the second communication channel to process the dummy data sent on the first timeslots. At step 210, the dummy data in each of the first timeslots is decoded by the second communication devices. At step 212, a set of predefined parameters for each of the first timeslots is evaluated based on the decoded dummy data. At step 214, information associated with the evaluated set of predefined parameters is forwarded to the base transceiver station by the second communication devices.

At step 216, it is determined whether the set of predefined parameters is below a predetermined threshold for at least one of the first timeslots. If it is determined that the set of predefined parameters is above the predetermined threshold for the at least one of the first timeslots, then at step 218, decoding of the dummy data is stopped by the remaining ones of the second communication devices and communication via the second communication channel is continued using the respective second timeslots. If it is determined that the set of predefined parameters is below the predetermined threshold for the at least one of the first timeslots, then at step 220, each one of the first timeslots are assigned to the corresponding one or more of the second communication devices.

At step 222, a third communication channel is established between the base transceiver station and the one or more of the second communication devices using the assigned first timeslots. At step 224, the second communication channel between the base transceiver station and the one or more of the second communication devices is relinquished. Moreover, in one exemplary embodiment, a non-transitory computer-readable storage medium for managing communication in the wireless communication network has instructions that, when executed by a computing device (e.g., such as a computing device 602 of FIG. 6), cause the computing device to perform the method of FIG. 2.

Figure 3:
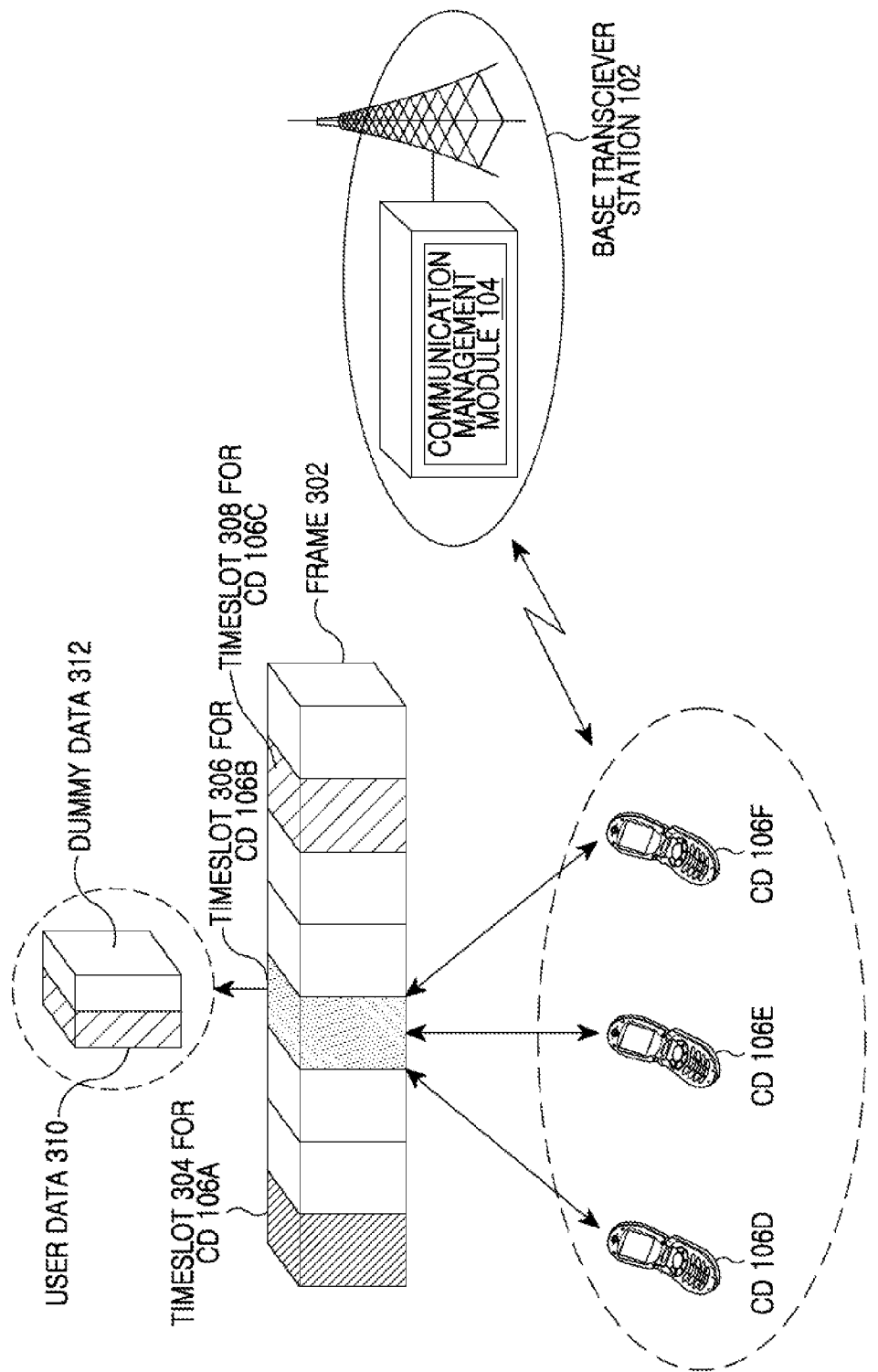
FIG. 3 illustrates a schematic representation of a wireless communication network in which a communication device evaluates a set of predefined parameters for a timeslot assigned to a communication device according to an exemplary embodiment of the present invention.

FIG. 3 illustrates a schematic representation of a wireless communication network in which a communication device evaluates a set of predefined parameters for a timeslot assigned to the communication device according to an exemplary embodiment of the present invention.

Referring to FIG. 3, the wireless communication network includes the base station 102 having the communication management module 104 and Communication Devices (CDs) 106A, 106B, 106C, 106D, 106E and 106F (CDs 106A-106C not illustrated). As can be seen, a transmission frame 302 includes a timeslot 304 assigned to the communication device 106A, a timeslot 306 assigned to the communication device 106B and a timeslot 308 assigned to the communication device 106C.

In an exemplary implementation, it is assumed that the communication devices 106D, 106E and 106F request the base transceiver station 102 to establish communication channels. In such a case, the communication management module 104 of the base transceiver station 102 sends dummy data 312 on the timeslot 306 assigned to the communication device 106B to determine which of the communication devices 106D-F can be paired with the communication device 106B to share the timeslot 306. Substantially simultaneously, the base transceiver station 102 sends user data 310 to the communication device 106B and orders the communication devices 106D-F to process the dummy data 312 sent on the time slot 306.

Upon receiving the dummy data 312, each of the communication devices 106D, 106E and 106F decodes the dummy data 312 and measures a set of predefined parameters for the timeslot 306 using the decoded dummy data 312. The set of parameters may include but not be limited to BER, QoE, signal quality, signal power associated with the timeslot 306 and the like.

Each of the communication devices 106D-F then sends a report including information associated with the measured set of predefined parameters to the base transceiver station 102. The communication management module 104 then determines whether the set of predefined parameters measured by each of the communication devices 106D-F for the timeslot 306 matches a predetermined threshold. If a match is found, then the communication management module 104 decides which of the communication devices 106D-F can be paired with the communication device 106B to share the timeslot 306. Based on the decision, a communication channel is established and user data is transmitted to the paired communication devices using the shared timeslot 306. The above described method helps perceive better link quality upon pairing operation. However, if no match is found, the communication management module 104 orders the associated communication devices to stop reporting the measured set of predefined parameters.

Figure 4:
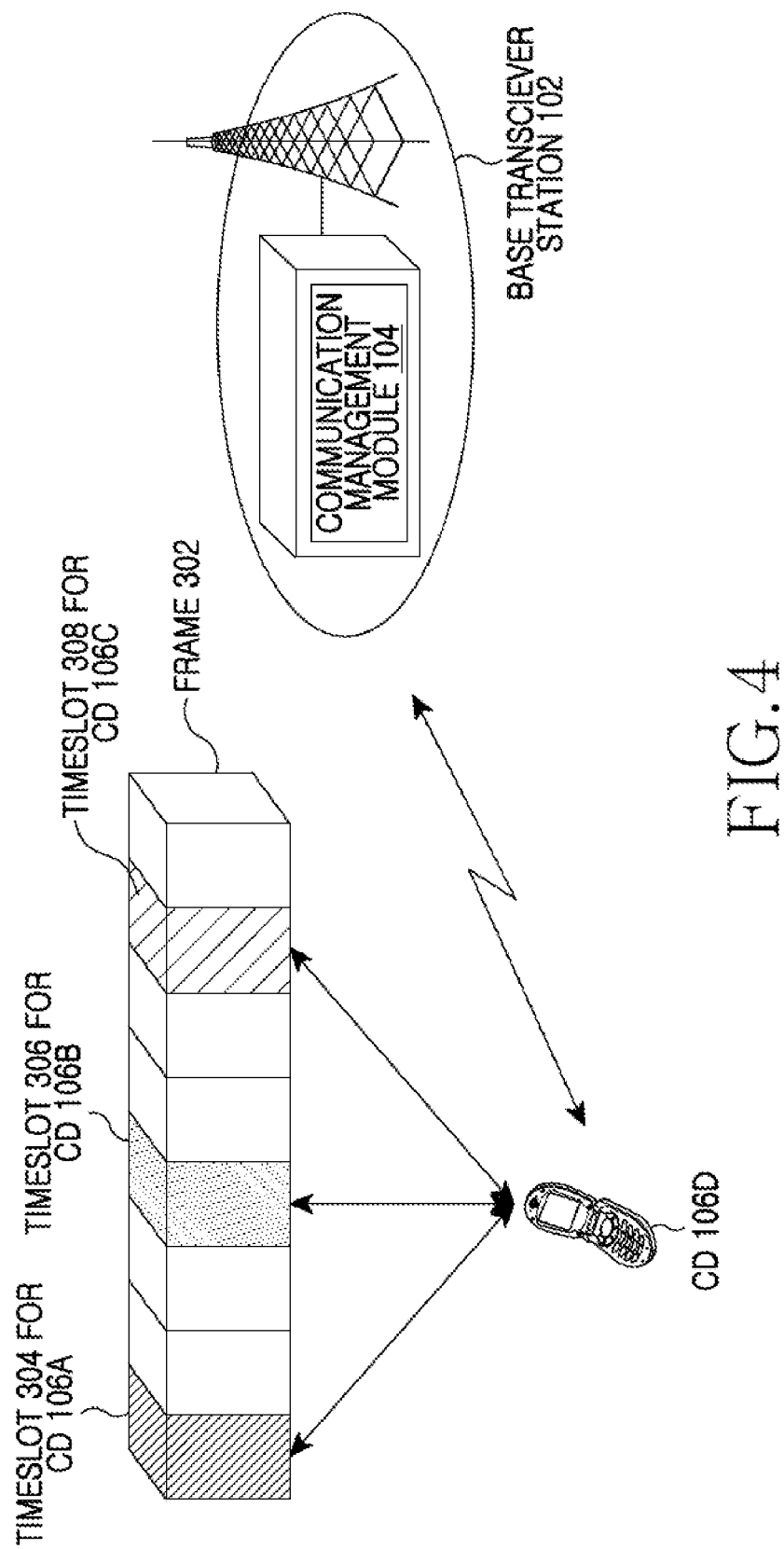
FIG. 4 illustrates a schematic representation of a wireless communication network in which a communication device evaluates a set of predefined parameters for timeslots assigned to the communication devices according to an exemplary embodiment of the present invention.

FIG. 4 illustrates a schematic representation of a wireless communication network in which a communication device evaluates a set of predefined parameters for timeslots assigned to the communication devices according to an exemplary embodiment of the present invention.

Referring to FIG. 4 the communication device 106D requests the base transceiver station 102 to establish a communication channel. In such a case, the communication management module 104 of the base transceiver station 102 sends dummy data on the timeslots 304, 306 and 308 of transmission frame 302 to determine whether the communication device 106D can be paired with any one of the communication devices 106A, 106B and 106C to share one of the associated timeslots 304, 306 and 308. Substantially simultaneously, the base transceiver station 102 sends user data to the communication devices 106A, 106B and 106C and orders the communication device 106D to process the dummy data sent on the time slots 304, 306 and 308.

Upon receiving the dummy data, the communication device 106D decodes the dummy data and measures a set of predefined parameters for the timeslots 304, 306 and 308 using the decoded dummy data. The set of parameters may include but not limited to BER, QoE, signal quality, signal power, and the like associated with each of the timeslots 304, 306 and 308.

The communication device 106D then sends a report including information associated with the measured set of predefined parameters to the base transceiver station 102. The communication management module 104 then determines whether the set of predefined parameter measured by the communication device 106D matches a predetermined threshold.

If the match is found, then the communication management module 104 decides whether the communication device 106D can be paired with any one of the communication devices 106A, 106B and 106C to share one of the timeslots 304, 306 and 308. Based on the decision, a communication channel is established and user data is transmitted to the paired communication device 106D using the shared timeslot. The above described method helps perceive better link quality upon a pairing operation. However, if no match is found, the communication management module 104 may order the communication device 106D to stop reporting the measured set of predefined parameters.

Figure 5:
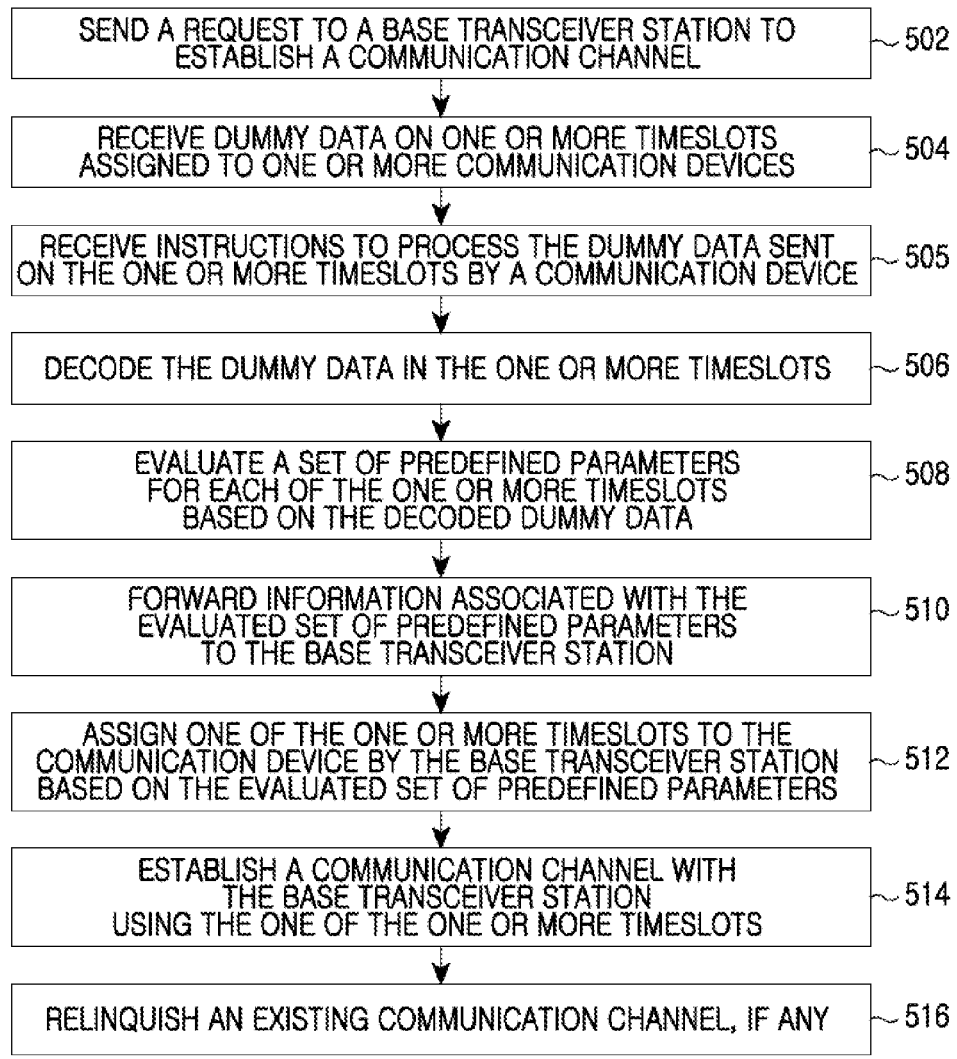
FIG. 5 is a flowchart illustrating a method of a communication device for managing communication in a wireless communication network according to an exemplary embodiment of the present invention.

FIG. 5 is a flowchart illustrating a method of a communication device for managing communication in a wireless communication network according to an exemplary embodiment of the present invention.

Referring to FIG. 5, at step 502, a request is sent to a base transceiver station to establish a communication channel. At step 504, dummy data is received on one or more timeslots assigned to one or more communication devices, where the one or more communication devices are in the same area of network as the communication device. In some exemplary embodiments, the dummy data on the plurality of timeslots assigned to the one or more communication devices is received substantially simultaneously to the receiving of user data in a timeslot previously assigned by the base transceiver station. At step 505, instructions to process the dummy data sent on the one or more timeslots are received by the communication device.

At step 506, the dummy data in the plurality of timeslots is decoded by the communication device based on the instructions. At step 508, a set of predefined parameters is evaluated for each of the one or more timeslots based on the decoded dummy data. For example, the set of predefined parameters may include BER, QoE, signal quality, signal power, and the like associated with the one or more timeslots. At step 510, information associated with the evaluated set of predefined parameters is forwarded to the base transceiver station. At step 512, one of the one or more timeslots is assigned to the communication device by the base transceiver station based on the evaluated set of predefined parameters.

At step 514, a communication channel is established with the base transceiver station using the one of the one or more timeslots. At step 516, if a communication channel was established, the existing communication channel is relinquished. Moreover, in one exemplary embodiment, a non-transitory computer-readable storage medium for managing communication in the wireless communication network has instructions that, when executed by a computing device (e.g., such as a computing device 602 of FIG. 6), cause the computing device to perform the method of FIG. 5.

Figure 6:
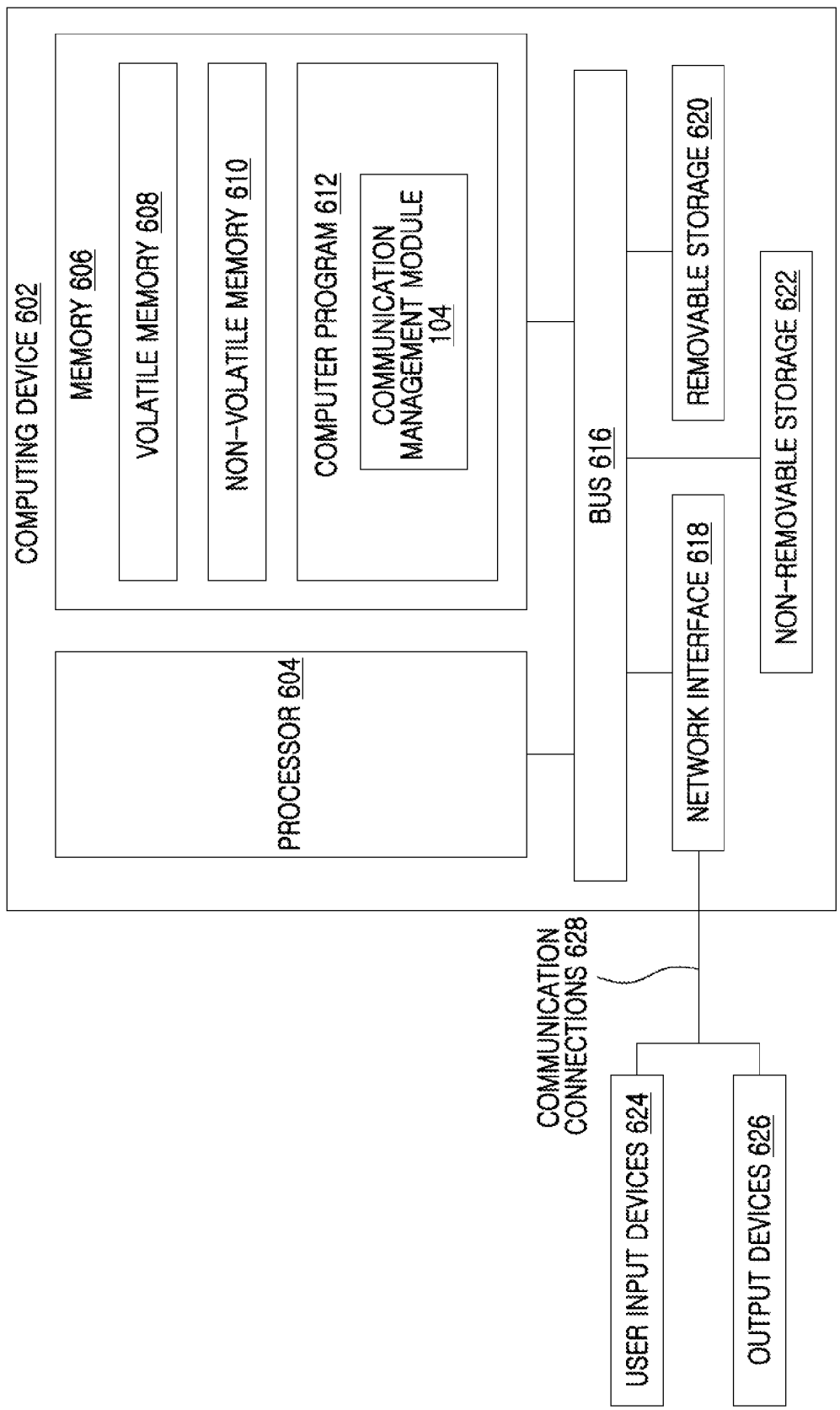
FIG. 6 illustrates a suitable computing system environment according to an exemplary embodiment of the present invention.

FIG. 6 illustrates a suitable computing system environment according to an exemplary embodiment of the present invention.

Referring to FIG. 6, the following discussion is intended to provide a brief, general description of a suitable computing environment in which certain exemplary embodiments of the inventive concept contained herein may be implemented.

A general computing device 602 may reside in a base transceiver station (e.g. the base transceiver station 102), in the form of a personal computer or a mobile device, and may include a processor 604, memory 606, a removable storage 620, and a non-removable storage 622. The computing device 602 additionally may include a bus 616 and a network interface 618. The computing device 602 may include or have access to the computing environment that includes one or more user input devices 624, one or more output devices 626, and one or more communication connections 628 such as a network interface card or a universal serial bus connection.

The one or more user input devices 624 may be a digitizer screen and a stylus, trackball, keyboard, keypad, mouse, and the like. The one or more output devices 626 may be a display device, display screen and the like coupled to the processor 604 of the computing device 602. The communication connections 628 may include a local area network, a wide area network, and/or other networks.

The memory 606 may include volatile memory 608 and non-volatile memory 610. A variety of computer-readable storage media may be stored in and accessed from the memory elements of the computing device 602, such as the volatile memory 608 and the non-volatile memory 610, the removable storage 620 and the non-removable storage 622. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 604, as used herein, denotes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 604 may also include embedded controllers, such as generic or programmable logic devices or arrays, application specific integrated circuits, single-chip computers, smart cards, and the like.

In accordance with exemplary embodiments of the present invention, functions, procedures, data structures, and application programs, for performing tasks, or defining abstract data types or low-level hardware contexts may be implemented in conjunction with program modules, including. Machine-readable instructions stored on any of the above-mentioned storage media may be executable by the processor 604 of the computing device 602.

For example, a computer program 612 may include machine-readable instructions capable of managing communication in a wireless communication network, according to the teachings and herein described embodiments of the present subject matter. In one exemplary embodiment, the computer program 614 may be included on a Compact Disk-Read Only Memory (CD-ROM) and loaded from the CD-ROM to a hard drive in the non-volatile memory 610. The machine-readable instructions may cause the computing device 602 to encode according to the various exemplary embodiments of the present subject matter.

As shown, the computer program 612 may include the communication management module 104 that may establish a first communication channel between the base transceiver station 102 and first communication devices 106A-H through first timeslots of a frame. Further, the communication management module 104 may establish a second communication channel between the base transceiver station 102 and second communication devices 106I-N through second timeslots of the frame.

Furthermore, the communication management module 104 may determine whether a third communication channel can be established between the base transceiver station 102 and at least one of the second communication devices 106I-N using at least one of the first timeslots based on a set of predefined parameters for each of the first timeslots. In some exemplary embodiments, the set of predefined parameters are evaluated by the second communication devices 106I-N. Moreover, the communication management module 104 may establish the third communication channel between the base transceiver station 102 and the at least one of the second communication devices 106I-N using the at least one of the first timeslots if the above determination is true.

In accordance with exemplary embodiments of the present invention, the communication management module 104 may relinquish the second communication channel between the base transceiver station 102 and the at least one of the second communication devices 106I-N upon establishing the third communication channel between the base transceiver station 102 and the at least one of the second communication devices 106I-N. Additionally, if the determination is false, the communication management module 104 may continue to communicate via the second communication channel using the second timeslots if the third communication cannot be established using the at least one of the first timeslots.

While the invention has been shown and described with reference to certain exemplary embodiments thereof, it will be understood by those skilled in that art that various changes in form and details may be made therein without departing from the spirit and scope of the invention as defined by the appended claims and their equivalents.

What is claimed is:

1. A method for managing communication in a wireless communication network, the method comprising:
   establishing a first communication channel between a base transceiver station and a plurality of first communication devices through first timeslots of a frame;
   establishing a second communication channel between the base transceiver station and a plurality of second communication devices through second timeslots of the frame;
   determining whether a third communication channel can be established between the base transceiver station and at least one of the plurality of the second communication devices through at least one of the first timeslots based on a set of predefined parameters evaluated for each of the first timeslots, wherein the set of predefined parameters are evaluated by the plurality of second communication devices; and
   if it is determined that the third communication channel can be established, establishing the third communication channel between the base transceiver station and the at least one of the plurality of the second communication devices through the at least one of the first timeslots.

2. The method of claim 1, further comprising:
   continuing communication via the second communication channel between the base transceiver station and remaining ones of the plurality of second communication devices using the respective second timeslots if the third communication channel cannot be established using the at least one of the first timeslots.

3. The method of claim 1, wherein the establishing of the second communication channel comprises:
   receiving one or more requests from the plurality of second communication devices;
   assigning the second timeslots of the frame to the plurality of second communication devices based on one or more requests; and
   establishing the second communication channel between the base transceiver station and the plurality of second communication devices using the second timeslots.

4. The method of claim 1, wherein the determining of whether the third communication channel can be established between the base transceiver station and the at least one of the second communication devices comprises:
   sending dummy data on the first timeslots to the plurality of second communication devices;
   ordering the plurality of second communication devices via the second communication channel to process the dummy data sent on the first timeslots;
   decoding the dummy data in each of the first timeslots by the plurality of second communication devices;
   evaluating a set of predefined parameters for each of the first timeslots based on the decoded dummy data by each of the plurality of second communication devices;
   forwarding information associated with the set of predefined parameters for each of the first timeslots to the base transceiver station by each of the plurality of second communication devices;
   determining whether the set of predefined parameters is below a predetermined threshold for at least one of the first timeslots;
   if it is determined that the set of predefined parameters is below a predetermined threshold for at least one of the first timeslots, assigning the at least one of the first timeslots to corresponding one or more of the plurality of second communication devices; and
   establishing the third communication channel between the base transceiver station and the corresponding one or more of the plurality of second communication devices using the assigned at least one of the first timeslots.

5. The method of claim 4, wherein the establishing of the third communication channel between the base transceiver station and the corresponding one or more of the plurality of second communication devices using the assigned at least one of the first timeslots comprises:
   relinquishing the second communication channel between the base transceiver station and the corresponding one or more of the plurality of second communication devices upon establishing the third communication channel between the base transceiver station and the corresponding one or more of the plurality of second communication devices.

6. The method of claim 5, wherein the dummy data comprises a predefined pseudo-random sequence in the first timeslots.

7. The method of claim 6, wherein the set of predefined parameters comprises at least one of Bit Error Rate (BER), Quality of Experience (QoE), signal quality and signal power associated with each of the first timeslots.

8. The method of claim 7, wherein the sending of the dummy data on the first timeslots to the plurality of second communication devices comprises:
   sending the dummy data on the first timeslots to the plurality of second communication devices substantially simultaneously to sending of user data on the second timeslots to the respective ones of the plurality of second communication devices.

9. The method of claim 8, wherein the sending of the dummy data in the first timeslots to the plurality of second communication devices comprises:
   substantially simultaneously sending user data to an associated one of the plurality of first communication devices and user data to the corresponding one or more of the plurality of second communication devices on the at least one of the first timeslots upon establishing the third communication channel.

10. The method of claim 9, wherein the sending of the dummy data to the plurality of second communication devices comprises selecting the plurality of second communication devices based on a geographical proximity of a communication device from the base transceiver station.

11. A computing device for managing communication in a wireless communication network, the computing device comprising:
    a network interface for establishing a first communication channel between a base transceiver station and a plurality of first communication devices through first timeslots of a frame, and for establishing a second communication channel between the base transceiver station and a plurality of second communication devices through second timeslots of the frame; and
    a processor for determining whether a third communication channel can be established between the base transceiver station and at least one of the plurality of the second communication devices through at least one of the first timeslots based on a set of predefined parameters evaluated for each of the first timeslots, wherein the set of predefined parameters are evaluated by the plurality of second communication devices, and for establishing the third communication channel between the base transceiver station and the at least one of the plurality of the second communication devices through the at least one of the first timeslots if it is determined that the third communication channel can be established.

12. The computing device of claim 11, wherein the network interface continues communication via the second communication channel between the base transceiver station and remaining ones of the plurality of second communication devices using the respective second timeslots if the third communication channel cannot be established using the at least one of the first timeslots.

13. The computing device of claim 11, wherein the determining of whether the third communication channel can be established between the base transceiver station and the at least one of the second communication devices by the processor comprises:
  sending dummy data on the first timeslots to the plurality of second communication devices;
  ordering the plurality of second communication devices via the second communication channel to process the dummy data sent on the first timeslots;
  decoding the dummy data in each of the first timeslots by the plurality of second communication devices;
  evaluating a set of predefined parameters for each of the first timeslots based on the decoded dummy data by each of the plurality of second communication devices;
  forwarding information associated with the set of predefined parameters for each of the first timeslots to the base transceiver station by each of the plurality of second communication devices;
  determining whether the set of predefined parameters is below a predetermined threshold for at least one of the first timeslots;
  if it is determined that the set of predefined parameters is below a predetermined threshold for at least one of the first timeslots, assigning the at least one of the first timeslots to corresponding one or more of the plurality of second communication devices; and
  establishing the third communication channel between the base transceiver station and the corresponding one of the plurality of second communication devices using the assigned at least one of the first timeslots.

14. The computing device of claim 13, wherein the establishing of the third communication channel between the base transceiver station and the at least one of the plurality of second communication devices using the at least one of the first timeslots by the network interface comprises:
  relinquishing the second communication channel between the base transceiver station and the corresponding one of the plurality of second communication devices upon establishing the third communication channel between the base transceiver station and the corresponding one or more of the plurality of second communication devices.

15. A system comprising:
  a plurality of first communication devices;
  a plurality of second communication devices; and
  a base transceiver station wirelessly coupled to the plurality of first and second communication devices via a plurality of wireless links, the base transceiver station comprising:
    a processor; and
    a memory coupled to the processor, wherein the memory includes a communication management module for establishing a first communication channel between a base transceiver station and the plurality of communication devices through first timeslots of a frame, for establishing a second communication channel between the base transceiver station and the plurality of second communication devices through second timeslots of the frame, for determining whether a third communication channel can be established between the base transceiver station and at least one of the plurality of the second communication devices through at least one of the first timeslots based on a set of predefined parameters evaluated for each the first timeslots, wherein the set of predefined parameters are evaluated by the plurality of second communication devices, and, if it is determined that the third communication channel can be established, for establishing the third communication channel between the base transceiver station and the at least one of the plurality of the second communication devices through the at least one of the first timeslots.

16. The system of claim 15, wherein the communication management module continues to communicate via the second communication channel between the base transceiver station and remaining ones of the plurality of second communication devices using the respective second timeslots if the third communication channel cannot be established using the at least one of the first timeslots.

17. The system of claim 15, wherein the communication management module relinquishes the second communication channel between the base transceiver station and the at least one of the plurality of second communication devices upon establishing the third communication channel between the base transceiver station and the at least one of the plurality of second communication devices.

18. The system of claim 15, wherein the set of predefined parameters comprises at least one of Bit Error Rate (BER), Quality of Experience (QoE), signal quality and signal power associated with each of the first timeslots.

19. A method of a communication device for managing communication in a wireless communication network, the method comprising:
  sending a request to a base transceiver station to establish a communication channel;
  receiving dummy data on one or more timeslots assigned to one or more communication devices, wherein the one or more communication devices are in the same area of network as the communication device;
  evaluating a set of predefined parameters for each of the one or more timeslots based on the dummy data; and
  establishing the communication channel with the base transceiver station using one of the one or more timeslots, wherein said one of the one or more timeslots is assigned to the communication device by the base transceiver station based on values of the evaluated set of predefined parameters for said each of the one or more timeslots.

20. The method of claim 19, wherein the evaluating of the set of predefined parameters for each of the one or more timeslots based on the dummy data comprises:
  receiving instructions to process the dummy data in the one or more timeslots by the communication device;
  decoding the dummy data in the one or more timeslots based on the instructions; and
  evaluating the set of predefined parameters for each of the one or more timeslots based on the decoded dummy data, and forwarding information associated with the evaluated set of predefined parameters to the base transceiver station.

21. The method of claim 19, further comprising:
  relinquishing an existing communication channel upon establishing the communication channel using the one of the one or more timeslots.

22. The method of claim 19, wherein the receiving of the dummy data in the one or more timeslots assigned to the one or more communication devices comprises:

receiving the dummy data in the one or more timeslots assigned to the one or more communication devices substantially simultaneously to receiving user data in a timeslot previously assigned by the base transceiver station.

23. The method of claim 19, wherein the set of predefined parameters comprises at least one of Bit Error Rate (BER), Quality of Experience (QoE), signal quality and signal power associated with each of the one or more timeslots.

24. A non-transitory computer-readable storage medium for managing communication in a wireless communication network having instructions that, when executed by a computing device, cause the computing device to perform a method comprising:

sending a request to a base transceiver station to establish a communication channel;

receiving dummy data in the one or more timeslots assigned to one or more communication devices, wherein the one or more communication devices are in the same area of network as the communication device;

evaluating a set of predefined parameters for each of the one or more timeslots based on the dummy data;

establishing the communication channel with the base transceiver station using one of the one or more timeslots, wherein said one of the one or more timeslots is assigned to the communication device by the base transceiver station based on the values of the evaluated set of predefined parameters for said each of the one or more timeslots.

* * * * *